(12) United States Patent
Takeda et al.

(10) Patent No.: US 12,074,476 B2
(45) Date of Patent: Aug. 27, 2024

(54) ADHESIVELY-LAMINATED CORE FOR STATOR AND ELECTRIC MOTOR

(71) Applicant: NIPPON STEEL CORPORATION, Tokyo (JP)

(72) Inventors: Kazutoshi Takeda, Tokyo (JP); Ryu Hirayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 580 days.

(21) Appl. No.: 17/293,961

(22) PCT Filed: Dec. 17, 2019

(86) PCT No.: PCT/JP2019/049257
§ 371 (c)(1),
(2) Date: May 14, 2021

(87) PCT Pub. No.: WO2020/129921
PCT Pub. Date: Jun. 25, 2020

(65) Prior Publication Data
US 2022/0014053 A1    Jan. 13, 2022

(30) Foreign Application Priority Data
Dec. 17, 2018    (JP) .................................. 2018-235865

(51) Int. Cl.
*H02K 1/18*    (2006.01)
*B32B 15/01*    (2006.01)

(52) U.S. Cl.
CPC ............ *H02K 1/185* (2013.01); *B32B 15/011* (2013.01)

(58) Field of Classification Search
CPC ..... H02K 15/024; H02K 1/185; B32B 15/011
(Continued)

(56) References Cited

U.S. PATENT DOCUMENTS 3,386,058 A    5/1968    Michel
4,025,379 A    5/1977    Whetstone
(Continued)

FOREIGN PATENT DOCUMENTS

CN    102792556 A    11/2012
EP    3553799 A1    10/2019
(Continued)

OTHER PUBLICATIONS

Japanese Industrial Standard (JIS) C 2552: 2014, relevance discussed in specification.
(Continued)

*Primary Examiner* — Alex W Mok
(74) *Attorney, Agent, or Firm* — Renner, Otto, Boisselle & Sklar, LLP

(57) ABSTRACT

In an adhesively-laminated core for a stator, a chemical component of each of electrical steel sheets includes 2.5% to 3.9% by mass of Si, an average tensile modulus of elasticity of each of adhesion parts is 2500 MPa to 5000 MPa, and when an average sheet thickness of the each of electrical steel sheets is t1 in units of mm, an average thickness of the each of adhesion parts is t2 in units of μm, and an average value of yield strengths of the each of electrical steel sheets is YP in units of MPa, a condition A of satisfying the following expressions 1, 2, and 3 or a condition B of satisfying the following expressions 3, 4, and 5 or combination thereof is satisfied.

| | |
|---|---|
| 50×t1−12≤t2≤50×t1−6 | (expression 1) |
| 0.15≤t1≤0.27 | (expression 2) |
| 0.5≤t2≤2.5 | (expression 3) |
| 0.025×YP−12≤t2≤0.025×YP−8 | (expression 4) |
| 380≤YP≤540 | (expression 5) |

6 Claims, 5 Drawing Sheets

(58) Field of Classification Search
USPC .................................................. 310/216.137
See application file for complete search history.

(56) References Cited

U.S. PATENT DOCUMENTS

| | | | |
|---|---|---|---|
| 4,103,195 A | 7/1978 | Torossian | |
| 4,413,406 A | 11/1983 | Bennett | |
| 5,142,178 A | 8/1992 | Kloster et al. | |
| 5,248,405 A | 9/1993 | Kaneda et al. | |
| 5,338,996 A | 8/1994 | Yamamoto | |
| 5,448,119 A | 9/1995 | Kono et al. | |
| 5,994,464 A | 11/1999 | Ohsawa et al. | |
| 6,495,936 B2 | 12/2002 | Kikuchi et al. | |
| 6,653,758 B2 | 11/2003 | Tsuneyoshi et al. | |
| 7,298,064 B2 | 11/2007 | Yamamoto | |
| 7,562,439 B2 | 7/2009 | Yamamoto | |
| 7,859,163 B2 | 12/2010 | Bertocchi et al. | |
| 7,952,254 B2 | 5/2011 | Cho et al. | |
| 8,015,691 B2 | 9/2011 | Miyake | |
| 8,580,217 B2 | 11/2013 | Hipszki et al. | |
| 8,581,468 B2 | 11/2013 | Kudose et al. | |
| 8,697,811 B2 | 4/2014 | Kishi et al. | |
| 8,943,677 B2* | 2/2015 | Gerster | C22C 38/12 336/200 |
| 9,331,530 B2 | 5/2016 | Jang et al. | |
| 9,512,335 B2 | 12/2016 | Hoshi et al. | |
| 9,770,949 B2 | 9/2017 | Fudemoto et al. | |
| 9,833,972 B2* | 12/2017 | Ohishi | B32B 15/011 |
| 10,340,754 B2 | 7/2019 | Ogino et al. | |
| 10,348,170 B2 | 7/2019 | Izumi et al. | |
| 10,476,321 B2 | 11/2019 | Li et al. | |
| 10,491,059 B2 | 11/2019 | Murakami et al. | |
| 10,547,225 B2 | 1/2020 | Hattori et al. | |
| 10,574,112 B2 | 2/2020 | Tomonaga | |
| 10,819,201 B2 | 10/2020 | Thumm et al. | |
| 10,840,749 B2 | 11/2020 | Chaillou et al. | |
| 11,056,934 B2 | 7/2021 | Kubota et al. | |
| 11,616,407 B2 | 3/2023 | Hino et al. | |
| 2002/0047459 A1 | 4/2002 | Adaeda et al. | |
| 2002/0163277 A1 | 11/2002 | Miyake et al. | |
| 2004/0056556 A1 | 3/2004 | Fujita | |
| 2004/0124733 A1 | 7/2004 | Yamamoto et al. | |
| 2006/0043820 A1 | 3/2006 | Nakahara | |
| 2007/0024148 A1 | 2/2007 | Maita et al. | |
| 2007/0040467 A1 | 2/2007 | Gu | |
| 2007/0182268 A1 | 8/2007 | Hashiba et al. | |
| 2009/0026873 A1 | 1/2009 | Matsuo et al. | |
| 2009/0195110 A1 | 8/2009 | Miyaki | |
| 2009/0230812 A1 | 9/2009 | Cho et al. | |
| 2010/0090560 A1 | 4/2010 | Myojin | |
| 2010/0197830 A1 | 8/2010 | Hayakawa et al. | |
| 2010/0219714 A1 | 9/2010 | Abe et al. | |
| 2010/0244617 A1 | 9/2010 | Nobata et al. | |
| 2011/0180216 A1 | 7/2011 | Miyake | |
| 2011/0269894 A1 | 11/2011 | Miyamoto | |
| 2012/0088096 A1 | 4/2012 | Takeda et al. | |
| 2012/0128926 A1* | 5/2012 | Ohishi | B32B 15/011 428/102 |
| 2012/0156441 A1 | 6/2012 | Gerster | |
| 2012/0235535 A1 | 9/2012 | Watanabe | |
| 2012/0288659 A1 | 11/2012 | Hoshi et al. | |
| 2013/0244029 A1 | 9/2013 | Igarashi et al. | |
| 2014/0023825 A1 | 1/2014 | Igarashi et al. | |
| 2015/0028717 A1 | 1/2015 | Luo et al. | |
| 2015/0097463 A1 | 4/2015 | Blocher et al. | |
| 2015/0130318 A1 | 5/2015 | Kitada et al. | |
| 2015/0256037 A1 | 9/2015 | Kudose | |
| 2015/0337106 A1 | 11/2015 | Kajihara | |
| 2016/0023447 A1 | 1/2016 | Shimizu | |
| 2016/0352159 A1 | 12/2016 | Li et al. | |
| 2016/0352165 A1 | 12/2016 | Fubuki | |
| 2017/0117758 A1 | 4/2017 | Nakagawa | |
| 2017/0287625 A1 | 10/2017 | Ito | |
| 2017/0342519 A1 | 11/2017 | Uesaka et al. | |
| 2017/0368590 A1 | 12/2017 | Senda et al. | |
| 2018/0030292 A1 | 2/2018 | Gotou | |
| 2018/0056629 A1* | 3/2018 | Hamamura | H02K 15/024 |
| 2018/0134926 A1* | 5/2018 | Lei | B32B 5/22 |
| 2018/0159389 A1 | 6/2018 | Nishikawa | |
| 2018/0212482 A1 | 7/2018 | Nigo | |
| 2018/0248420 A1* | 8/2018 | Enokizono | H02K 1/00 |
| 2018/0295678 A1 | 10/2018 | Okazaki et al. | |
| 2018/0309330 A1 | 10/2018 | Ueda | |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0048499 A1 | 2/2020 | Andou et al. | |
| 2020/0099263 A1 | 3/2020 | Hirosawa et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 62-009951 A | 1/1987 |
| JP | 63-207639 A | 8/1988 |
| JP | 01-168777 A | 7/1989 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |

(56) References Cited

FOREIGN PATENT DOCUMENTS

| | | |
|---|---|---|
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan, RM-92-79, 1992.
Datasheet of Nylon 6, Cast (Year: N/A, Printed Jun. 28, 2023).
MATWEB, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

* cited by examiner

ADHESIVELY-LAMINATED CORE FOR STATOR AND ELECTRIC MOTOR

TECHNICAL FIELD

The present invention relates to an adhesively-laminated core for a stator and an electric motor.

Priority is claimed on Japanese Patent Application No. 2018-235865 filed in Japan on Dec. 17, 2018, the content of which is incorporated herein by reference.

BACKGROUND ART

Conventionally, a laminated core as described in Patent Document 1 below is known. In Patent Document 1 described below, a problem is to improve a heat conduction performance in a stacking direction, while securing an adhesion strength and electrical insulating properties between electrical steel sheets. In order to solve the problem, a laminated core formed by laminating electrical steel sheets each having an insulation coating on a surface and having a configuration in which at least an organic substance layer formed of an adhesive organic substance is present between the electrical steel sheets and an average thickness of the organic substance layers is 4 μm or less is employed. The adhesive organic substance has a viscosity of 1.0 Pa·s or less at a temperature at which fluidity is required before a curing reaction. Also, the organic substance layer is injected between the electrical steel sheets using a vacuum impregnation method.

CITATION LIST

Patent Document

Patent Document 1

Japanese Unexamined Patent Application, First Publication No. 2004-88970

SUMMARY OF THE INVENTION

Problems to be Solved by the Invention

An electrical steel sheet and an adhesive organic substance (hereinafter referred to as an adhesion part) have thermal expansion coefficients different from each other. Therefore, when electrical steel sheets are simply caused to be adhered to each other and heated to cure an adhesion part as in Patent Document 1, the adhesion part is thermally shrunk and compressive stress or tensile stress is applied to the electrical steel sheets. When these stresses are applied to the electrical steel sheets, there is a likelihood that the magnetic properties of a laminated core will deteriorate. This deterioration in magnetic properties is much more likely to appear as the electrical steel sheets is thinner and the adhesion part is thicker.

On the other hand, even in a case of a room temperature curing type adhesive, shrinkage occurs when it is cured. Therefore, in any of the thermosetting type and the room temperature curing type, there is a likelihood that the cure shrinkage thereof will cause deterioration in magnetic properties.

The present invention has been made in view of the above circumstances, and an object of the present invention is to provide an adhesively-laminated core for a stator in which deterioration in magnetic properties due to cure shrinkage of an adhesive can be suppressed, and an electric motor including the adhesively-laminated core for a stator.

Means for Solving the Problem

In order to solve the above-described problems, the present invention employs the following means.

(1) An adhesively-laminated core for a stator according to one aspect of the present invention includes a plurality of electrical steel sheets laminated on each other and each coated on both sides with an insulation coating, and an adhesion part disposed in a plurality of dots between each of electrical steel sheets adjacent to each other in a stacking direction and configured to cause the each of electrical steel sheets to be adhered to each other, in which a chemical component of the each of electrical steel sheets includes 2.5% to 3.9% by mass of Si, an average tensile modulus of elasticity of each of adhesion parts is 2500 MPa to 5000 MPa, and when an average sheet thickness of the each of electrical steel sheets is t1 in units of mm, an average thickness of the each of adhesion parts is t2 in units of μm, and an average value of yield strengths of the each of electrical steel sheets is YP in units of MPa, a condition A of satisfying the following expressions 1, 2, and 3 or a condition B of satisfying the following expressions 3, 4, and 5 or a combination thereof is satisfied.

| | |
|---|---|
| $50 \times t1 - 12 \leq t2 \leq 50 \times t1 - 6$ | (expression 1) |
| $0.15 \leq t1 \leq 0.27$ | (expression 2) |
| $0.5 \leq t2 \leq 2.5$ | (expression 3) |
| $0.025 \times YP - 12 \leq t2 \leq 0.025 \times YP - 8$ | (expression 4) |
| $380 \leq YP \leq 540$ | (expression 5) |

Here, as a material constituting the insulation coating, for example, (1) an inorganic compound, (2) an organic resin, (3) a mixture of an inorganic compound and an organic resin, or the like can be employed. Of these, when the insulation coating is (1) an inorganic compound or (3) a mixture of an inorganic compound and an organic resin, deterioration in magnetic properties due to cure shrinkage of the adhesive can be significantly suppressed.

(2) The following configuration may be employed in the above-described (1). Only the condition A is satisfied, or both the condition A and the condition B are satisfied, in which the average sheet thickness t1 is in a range of 0.20 mm to 0.25 mm, and the average thickness t2 is in a range of 1.0 μm to 2.0 μm.

(3) The following configuration may be employed in the above-described (1). Only the condition B is satisfied, or both the condition A and the condition B are satisfied, in which the average thickness t2 is in a range of 1.0 μm to 2.0 μm, and the average value YP of the yield strengths is in a range of 450 MPa to 500 MPa.

(4) In any one of the above-described (1) to (3), the each of adhesion parts may contain an acrylic-based oil surface adhesive or an epoxy-based oil surface adhesive or a combination thereof as an oil component.

(5) In any one of the above-described (1) to (3), the each of adhesion parts may be an acrylic-based adhesive of a room temperature curing type containing a second generation acrylic adhesive (SGA) including an elastomer-containing acrylic-based adhesive.

(6) An electric motor according to one aspect of the present invention includes the adhesively-laminated core for a stator according to any one of the above-described (1) to (5).

Effects of the Invention

According to the above-described aspects of the present invention, it is possible to provide an adhesively-laminated core for a stator in which deterioration in magnetic properties due to cure shrinkage of an adhesive can be suppressed and an electric motor including the adhesively-laminated core for a stator.

EMBODIMENTS FOR IMPLEMENTING THE INVENTION

Hereinafter, an adhesively-laminated core for a stator according to one embodiment of the present invention and an electric motor including the adhesively-laminated core for a stator will be described with reference to the drawings. In the present embodiment, a motor, specifically an AC motor, more specifically a synchronous motor, and even more specifically a permanent magnetic field type electric motor will be described as one example of the electric motor. A motor of this type is suitably employed for, for example, electric automobiles.

Figure 1:
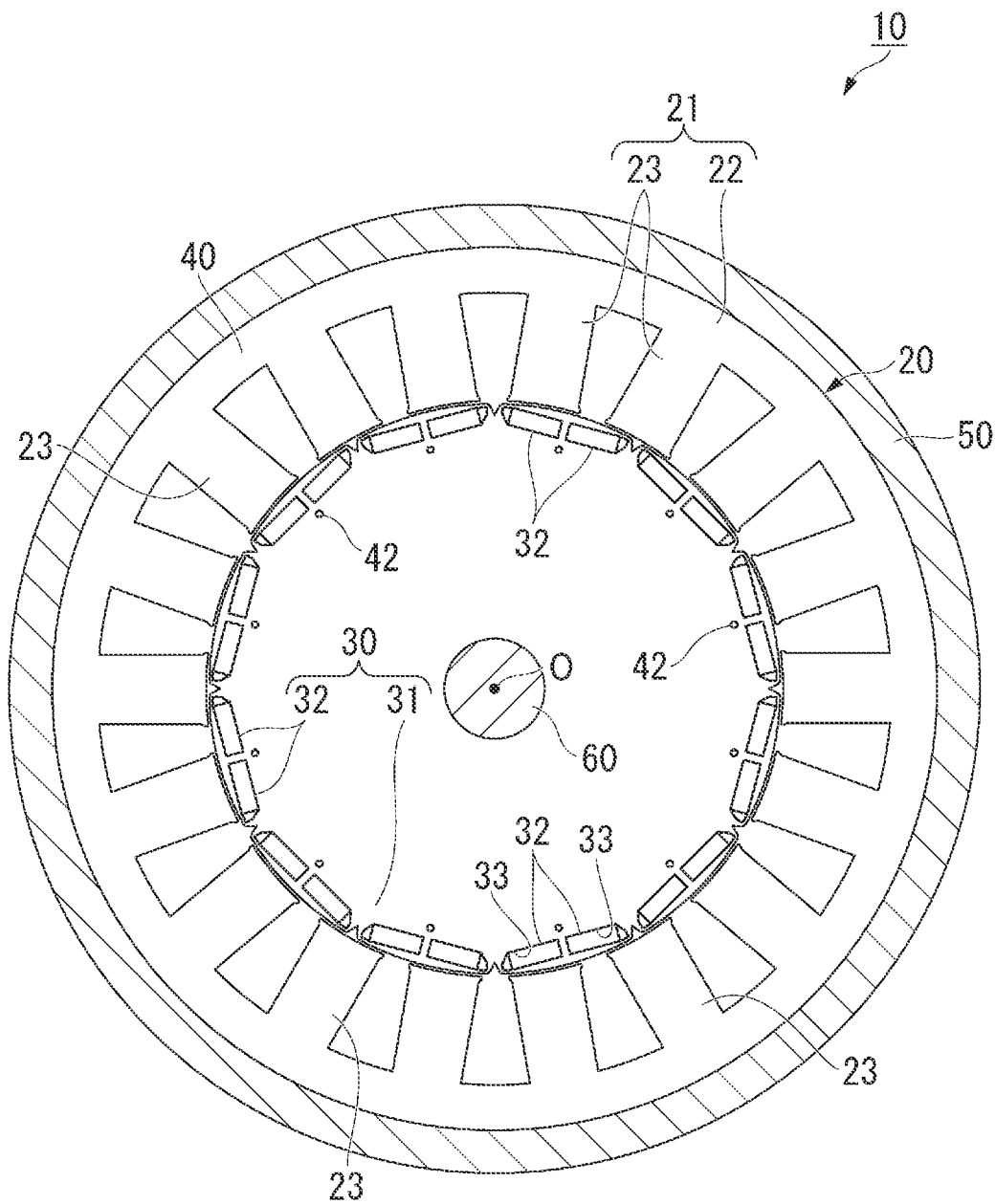
FIG. 1 is a cross-sectional view of an electric motor including an adhesively-laminated core for a stator according to one embodiment of the present invention.

As illustrated in FIG. 1, an electric motor 10 includes a stator 20, a rotor 30, a case 50, and a rotation shaft 60. The stator 20 and the rotor 30 are housed in the case 50. The stator 20 is fixed in the case 50.

In the present embodiment, an inner rotor type in which the rotor 30 is positioned on a radially inner side of the stator 20 is employed as the electric motor 10. However, an outer rotor type in which the rotor 30 is positioned on an outer side of the stator 20 may also be employed as the electric motor 10. Also, in the present embodiment, the electric motor 10 is a 12-pole 18-slot three-phase AC motor. However, the number of poles, the number of slots, the number of phases, or the like can be changed as appropriate.

The electric motor 10 can rotate at a rotation speed of 1000 rpm by applying, for example, an excitation current having an effective value of 10 A and a frequency of 100 Hz to each phase.

The stator 20 includes an adhesively-laminated core for a stator (hereinafter referred to as a stator core) 21 and a winding (not illustrated).

The stator core 21 includes an annular core back part 22 and a plurality of tooth parts 23. Hereinafter, a central axis O direction of the stator core 21 (or the core back part 22) is referred to as an axial direction, a radial direction (direction perpendicular to the central axis O) of the stator core 21 (or the core back part 22) is referred to as a radial direction, and a circumferential direction (direction revolving around the central axis O) of the stator core 21 (or the core back part 22) is referred to as a circumferential direction.

The core back part 22 is formed in an annular shape in a planar view of the stator 20 from the axial direction.

The plurality of tooth parts 23 protrude inward in the radial direction (toward the central axis O of the core back part 22 in the radial direction) from an inner circumference of the core back part 22. The plurality of tooth parts 23 are disposed at equiangular intervals in the circumferential direction. In the present embodiment, 18 tooth parts 23 are provided at every 20 degrees in terms of the central angle with the central axis O as a center. The plurality of tooth parts 23 are formed to have the same shape and the same size as each other. Therefore, the plurality of tooth parts 23 have the same thickness dimension as each other.

The winding is wound around the tooth parts 23. The winding may be a concentrated winding or a distributed winding.

The rotor 30 is disposed on a radially inner side with respect to the stator 20 (the stator core 21). The rotor 30 includes a rotor core 31 and a plurality of permanent magnets 32.

The rotor core 31 is formed in a ring shape (annular shape) disposed coaxially with the stator 20. The rotation shaft 60 is disposed in the rotor core 31. The rotation shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equiangular intervals in the circumferential direction. In the present embodiment, 12 sets (24 in total) of the permanent magnets 32 are provided at every 30 degrees in terms of the central angle with the central axis O as a center.

In the present embodiment, an embedded magnet type motor is employed as the permanent magnetic field type electric motor. A plurality of through-holes 33 penetrating the rotor core 31 in the axial direction are formed in the rotor core 31. The plurality of through-holes 33 are provided corresponding to a disposition of the plurality of permanent magnets 32. The permanent magnets 32 are each fixed to the rotor core 31 in a state of being disposed in the corresponding through-hole 33. Fixing of each permanent magnet 32 to the rotor core 31 can be realized, for example, by causing an outer surface of the permanent magnet 32 and an inner surface of the through-hole 33 to be adhered to each other using an adhesive. Further, a surface permanent magnet motor may be employed as the permanent magnetic field type electric motor instead of an interior magnet type motor.

Figure 2:
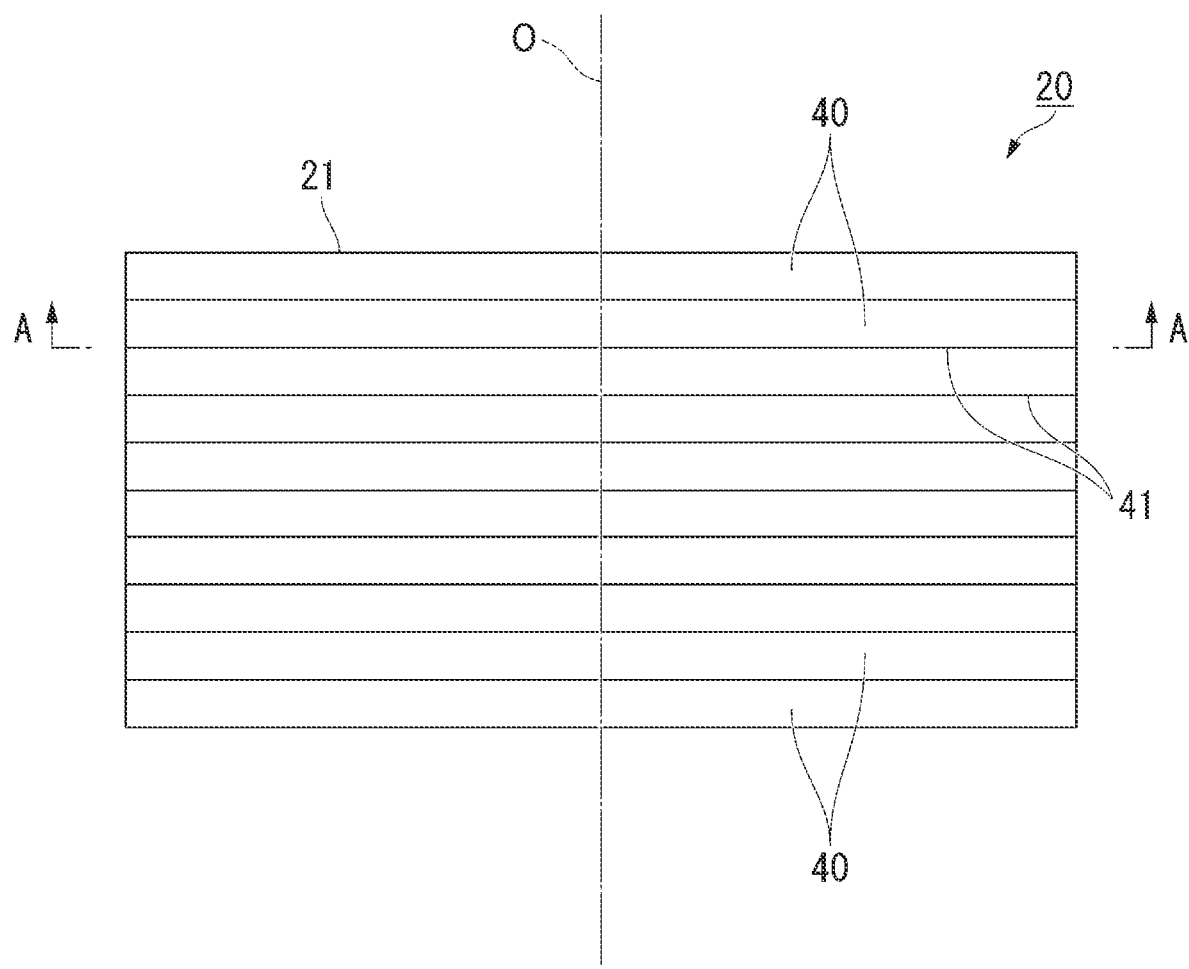
FIG. 2 is a side view of the adhesively-laminated core for a stator.

Both the stator core 21 and the rotor core 31 are laminated cores. As illustrated in FIG. 2, the stator core 21 may be formed by, for example, laminating a plurality of electrical steel sheets 40 in a stacking direction.

Laminated thicknesses (entire length along the central axis O) of the stator core 21 and the rotor core 31 may each be, for example, 50.0 mm. An outer diameter of the stator core 21 may be, for example, 250.0 mm. An inner diameter of the stator core 21 may be, for example, 165.0 mm. An outer diameter of the rotor core 31 may be, for example, 163.0 mm. An inner diameter of the rotor core 31 may be, for example, 30.0 mm. However, these values are an example, and the laminated thickness, the outer diameter, and the inner diameter of the stator core 21, and the laminated thickness, the outer diameter, and the inner diameter of the rotor core 31 are not limited only to these values. Here, a distal end portion of the tooth part 23 of the stator core 21 is used as a reference of the inner diameter of the stator core 21. That is, the inner diameter of the stator core 21 is a diameter of a virtual circle inscribed in the distal end portions of all the tooth parts 23.

Each of the electrical steel sheet 40 forming the stator core 21 and the rotor core 31 may be formed by, for example, punching an electrical steel sheet serving as a base material or the like. As the electrical steel sheet 40, a known electrical steel sheet can be used. A chemical composition of the electrical steel sheet 40 includes 2.5% to 3.9% of Si in units of % by mass as illustrated below. A range of the chemical composition other than Si is not particularly limited, but a satisfactory range in the present embodiment is specified below. When the chemical composition is within this range, an average value YP of a yield strength of each electrical steel sheet 40 can be set to 380 MPa or more and 540 MPa or less.

Si: 2.5% to 3.9%
Al: 0.001% to 3.0%
Mn: 0.05% to 5.0%
Remainder: Fe and impurities In the present embodiment, a non-grain-oriented electrical steel sheet is employed as the electrical steel sheet 40. A non-grain-oriented electrical steel strip of JIS C 2552:2014 can be employed as the non-grain-oriented electrical steel sheet. However, a grain-oriented electrical steel sheet may also be employed as the electrical steel sheet 40 instead of a non-grain-oriented electrical steel sheet. As the grain-oriented electrical steel sheet in this case, a grain-oriented electrical steel strip of JIS C 2553:2012 can be employed.

In order to improve workability of the electrical steel sheet 40 and iron loss of the stator core 21 (hereinafter, may be simply referred to as "laminated core"), both sides of the electrical steel sheet 40 are coated with an insulation coating. As a material constituting the insulation coating, for example, (1) an inorganic compound, (2) an organic resin, (3) a mixture of an inorganic compound and an organic resin, or the like can be employed. Of these, when the insulation coating is (1) an inorganic compound or (3) a mixture of an inorganic compound and an organic resin, deterioration in magnetic properties due to cure shrinkage of each adhesion part can be significantly suppressed. As the inorganic compound, for example, (1) a compound of dichromate and a boric acid, and (2) a compound of phosphate and silica or the like can be exemplified. As the organic resin, an epoxy-based resin, an acrylic-based resin, an acrylic-styrene-based resin, a polyester-based resin, a silicone-based resin, a fluorine-based resin, or the like can be exemplified.

In order to secure an insulation performance between the electrical steel sheets 40 laminated on each other, an upper limit value of an average thickness of the insulation coating (average thickness per one side of the electrical steel sheet 40) may be set to 1.5 μm, and more preferably 1.2 μm.

On the other hand, an insulating effect becomes saturated as the insulation coating becomes thicker. Also, as the insulation coating becomes thicker, a proportion occupied by the electrical steel sheet 40 in the laminated core decreases and a performance as the laminated core deteriorates. Therefore, the insulation coating is preferably made thin in a range in which the insulating performance can be secured. A lower limit value of the average thickness of the insulation coating (thickness per one side of the electrical steel sheet 40) may be set to 0.3 μm, and more preferably 0.5 μm. As the average thickness of the insulation coating, for example, 0.8 μm can be employed within the upper and lower limit ranges described above.

The average thickness of the insulation coating is an average value in the entire laminated core. The thickness of the insulation coating is made such that it hardly changes throughout laminated positions in the stacking direction and circumferential positions around the central axis of the laminated core. Therefore, the average thickness of the insulation coating can be set to a value by taking a numerical value measured at an upper end position of the laminated core. Further, an electrical steel sheet on which an insulation coating is not formed may be used instead of the electrical steel sheet 40 on which an insulation coating is formed.

When other factors such as an influence of cure shrinkage of an adhesion part 41 to be described below on magnetic properties of the electrical steel sheet 40 are also considered, it is preferable to employ 0.15 mm or more and 0.27 mm or less as an average thickness t1 of each electrical steel sheet 40, but the present invention is effective even when the average thickness t1 is outside this range.

When the average thickness t1 of the electrical steel sheets 40 is reduced to less than 0.15 mm, compressive stress and tensile stress due to cure shrinkage of the adhesion part 41 are likely to occur in each electrical steel sheet 40, and as a result, there is a likelihood that the magnetic properties of each electrical steel sheet 40 will deteriorate. On the other hand, when the average thickness t1 of the electrical steel sheets 40 exceeds 0.27 mm, an absolute value of iron loss increases and effects of the magnetic properties may not be obtained. Further, the thickness of the electrical steel sheet 40 includes the thickness of the insulation coating.

The average thickness t1 of the electrical steel sheets 40 is an average value in the entire laminated core. The thickness of each electrical steel sheet 40 is made such that it hardly changes throughout laminated positions in the stacking direction and circumferential positions around the central axis of the laminated core. Therefore, the average thickness t1 of the electrical steel sheets 40 can be set to a value by taking a numerical value measured at an upper end position of the laminated core.

Figure 3:
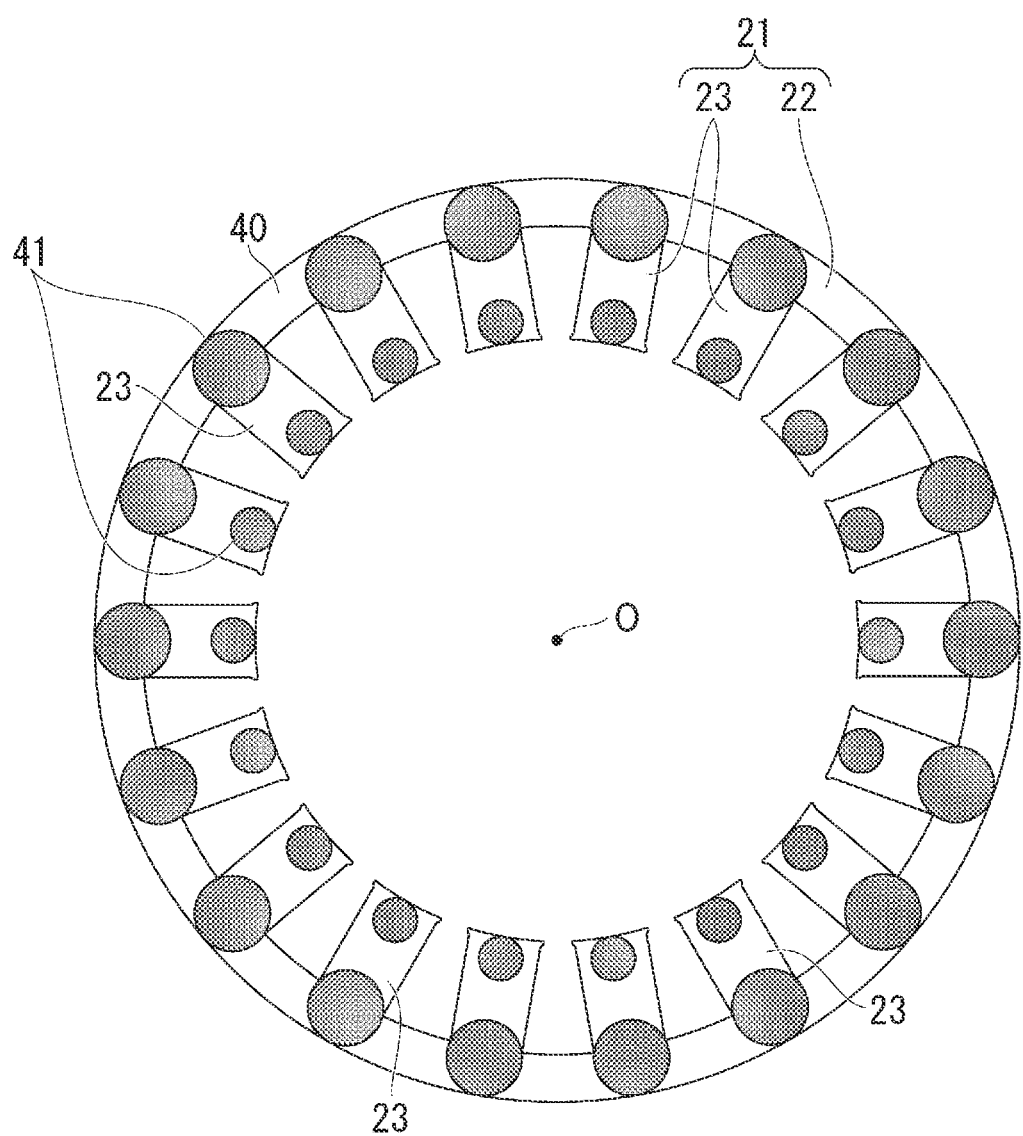
FIG. 3 is a cross-sectional view along line A-A of FIG. 2 and is a view illustrating an example of an adhesion part formation pattern in the adhesively-laminated core for a stator.

As illustrated in FIG. 3, the plurality of electrical steel sheets 40 forming the stator core 21 are laminated via the adhesion part 41 disposed in a plurality of dots. Each adhesion part 41 is an adhesive that is cured without being divided. For example, a thermosetting adhesive by polymer bonding or the like may be used for the adhesion part 41. As the adhesive for forming the adhesion part 41, an oil surface adhesive containing (1) acrylic-based resin, (2) epoxy-based resin, (3) acrylic-based resin and epoxy-based resin can be used. Therefore, the adhesion part 41 contains an acrylic-based oil surface adhesive or an epoxy-based oil surface adhesive or combination thereof as the oil component.

As the adhesive for forming the adhesion part 41, a radical polymerization type adhesive or the like can also be used in addition to the thermosetting adhesive, and from a viewpoint of productivity, a room temperature curing type adhesive is preferably used. The room temperature curing type adhesive is cured at 20° C. to 30° C. As the room temperature curing type adhesive, an acrylic-based adhesive is preferable. A typical acrylic-based adhesive includes a second generation acrylic adhesive (SGA) or the like. An anaerobic adhesive, any of an instant adhesive, and an elastomer-containing acrylic-based adhesive can be used in a range in which effects of the present invention are not impaired.

Further, the adhesive as used herein refers to a state before it is cured and becomes the adhesion part 41 after the adhesive is cured.

An average tensile modulus of elasticity of the adhesion parts 41 at room temperature (20° C. to 30° C.) is configured in a range of 2500 MPa to 5000 MPa. When the average tensile modulus of elasticity of the adhesion parts 41 is less than 2500 MPa, a problem in which a rigidity of the laminated core reduces occurs. Therefore, a lower limit value of the average tensile modulus of elasticity of the adhesion parts 41 is set to 2500 MPa, and more preferably 3000 MPa. Conversely, when the average tensile modulus of elasticity of the adhesion parts 41 exceeds 5000 MPa, a stress strain applied to the electrical steel sheet 40 increases and this causes a problem that core magnetism deteriorates. Therefore, an upper limit value of the average tensile modulus of elasticity of the adhesion parts 41 is set to 5000 MPa, and more preferably 4500 MPa. The average tensile modulus of elasticity of each of adhesion parts 41 can be adjusted by changing any one or both of heating and pressurizing conditions applied at the time of adhesion at a stacking station 140 and types of curing agent.

Further, the average tensile modulus of elasticity is measured by a resonance method. Specifically, the tensile modulus of elasticity is measured in accordance with JIS R 1602:1995.

More specifically, first, a sample for measurement (not illustrated) is manufactured. This sample is obtained by causing two electrical steel sheets 40 to be adhered using an adhesive to be measured and curing them to form the adhesion part 41. When the adhesive is a thermosetting type, the curing is performed by heating and pressurizing under heating and pressurizing conditions used in actual operations. On the other hand, when the adhesive is a room temperature curing type, the curing is performed by pressurizing at room temperature.

Then, a tensile modulus of elasticity of the sample is measured by the resonance method. As described above, a measurement method for the tensile modulus of elasticity using the resonance method is performed in accordance with JIS R 1602:1995. Thereafter, when an amount of influence by the electrical steel sheet 40 itself is removed from the tensile modulus of elasticity (measured value) of the sample by calculation, the tensile modulus of elasticity of the adhesion part 41 alone can be obtained.

Since the tensile modulus of elasticity obtained from the sample in this way is equal to an average value of the entire laminated core, this numerical value is regarded as the average tensile modulus of elasticity. The composition is set such that the average tensile modulus of elasticity hardly changes throughout laminated positions in the stacking direction and circumferential positions around the central axis of the laminated core. Therefore, the average tensile modulus of elasticity can also be set to a value with the cured adhesion part 41 at an upper end position of the laminated core.

As an adhesion method between the plurality of electrical steel sheets 40, a method of adhesion in which the electrical steel sheets 40 are overlapped after an adhesive in a dot shape is applied on lower surfaces (surfaces on one side) of them and are cured by performing any one or both of heating and press-stacking to form the adhesion part 41 can be employed. Further, a heating means may be any means such as, for example, heating the stator core 21 in a high temperature bath or an electric furnace or a method of heating by directly energizing the stator core 21. On the other hand, when a room temperature curing type adhesive is used, the electrical steel sheets 40 are adhered to each other only by press-stacking without heating.

FIG. 3 illustrates an example of a formation pattern of the adhesion part 41. The adhesion part 41 is formed in a plurality of circular dots. More specifically, the adhesion part 41 is formed in a dot shape with an average diameter of 12 mm in the core back part 22 at equiangular intervals in the circumferential direction. Further, at a distal end position of each tooth part 23 as well, the adhesion part 41 is formed in a dot shape with an average diameter of 8 mm. The average diameter illustrated here is an example and can be appropriately selected from a range of 2 mm to 20 mm. Also, the formation pattern of FIG. 3 is an example, and the number and disposition of the adhesion parts 41 can be appropriately changed as necessary. Also, the shape of each adhesion part 41 is not limited only to a circular shape and may be a rectangular shape or other polygonal shapes as necessary.

An average thickness t2 of the adhesion parts 41 is 0.5 μm or more and 2.5 μm or less. When the average thickness t2 of the adhesion parts 41 is less than 0.5 μm, a sufficient adhesion force cannot be secured. Therefore, a lower limit value of the average thickness t2 of the adhesion parts 41 is set to 0.5 μm, and more preferably 0.8 μm. Conversely, when the average thickness t2 of the adhesion parts 41 increases more than 2.5 μm, a problem such as a large increase in strain amount of the electrical steel sheet 40 due to thermosetting shrinkage occurs. Therefore, an upper limit value of the average thickness t2 of the adhesion parts 41 is set to 2.5 μm, and more preferably 2.0 μm.

The average thickness t2 of the adhesion parts 41 is an average value in the entire laminated core. The average thickness t2 of the adhesion parts 41 hardly changes throughout laminated positions in the stacking direction and circumferential positions around the central axis of the laminated core. Therefore, the average thickness t2 of the adhesion parts 41 can be set to an average value of numerical values measured at 10 or more points in the circumferential direction at upper end positions of the laminated core.

Further, the average thickness of the adhesion parts 41 can be adjusted by changing, for example, an application amount of the adhesive.

Further, in the adhesively-laminated core for a stator, when the average sheet thickness of the electrical steel sheets 40 is t1 in units of mm, the average thickness of the adhesion parts 41 is t2 in units of and the average value of yield strengths of the electrical steel sheets 40 is YP in units of MPa, a condition A of satisfying the following expressions 1, 2, and 3 or a condition B of satisfying the following expressions 3, 4, and 5 or combination thereof is satisfied.

$$50 \times t1 - 12 \leq t2 \leq 50 \times t1 - 6 \quad \text{(expression 1)}$$

$$0.15 \leq t1 \leq 0.27 \quad \text{(expression 2)}$$

$$0.5 \leq t2 \leq 2.5 \quad \text{(expression 3)}$$

$$0.025 \times YP - 12 \leq t2 \leq 0.025 \times YP - 8 \quad \text{(expression 4)}$$

$$380 \leq YP \leq 540 \quad \text{(expression 5)}$$

Regarding the above-described expression 1, when the average thickness t2 of the adhesion parts 41 is smaller than 50×t1−12, an adhesion strength between the steel sheets decreases. On the other hand, when the average thickness t2 of the adhesion parts 41 is larger than 50×t1−6, a strain amount of the electrical steel sheets 40 due to cure shrinkage of the adhesive increases significantly. As described above, the average thickness t2 of the adhesion parts 41 is configured in the range of expression 1.

Next, regarding the above-described expression 4, when the average thickness t2 of the adhesion parts 41 is smaller than 0.025×YP−12, a mechanical strength of the stator core 21 cannot be maintained. On the other hand, when the average thickness t2 of the adhesion parts 41 is larger than 0.025×YP−8, a stress applied to the laminated core due to cure shrinkage of the adhesive increases and the core magnetism deteriorates. As described above, the average thickness t2 of the adhesion parts 41 is configured in the range of the expression 4.

In addition to the description specified above, when only the condition A is satisfied or both the condition A and the condition B are satisfied, it is more preferable that the average sheet thickness t1 be in a range of 0.20 mm to 0.25 mm, and the average thickness t2 be in a range of 1.0 μm to 2.0 μm.

Also, when only the condition B is satisfied or both the condition A and the condition B are satisfied, it is more preferable that the average thickness t2 be in a range of 1.0 μm to 2.0 and the average value YP of the yield strengths be in a range of 450 MPa to 500 MPa.

In the present embodiment, a plurality of electrical steel sheets forming the rotor core 31 are fixed to each other by a fastener 42 (dowel) illustrated in FIG. 1. However, the plurality of electrical steel sheets forming the rotor core 31 may also have a laminated structure fixed by an adhesive as in the stator core 21.

Also, the laminated cores such as the stator core 21 and the rotor core 31 may be formed by so-called turn-stacking.

EXAMPLE

Figure 4:
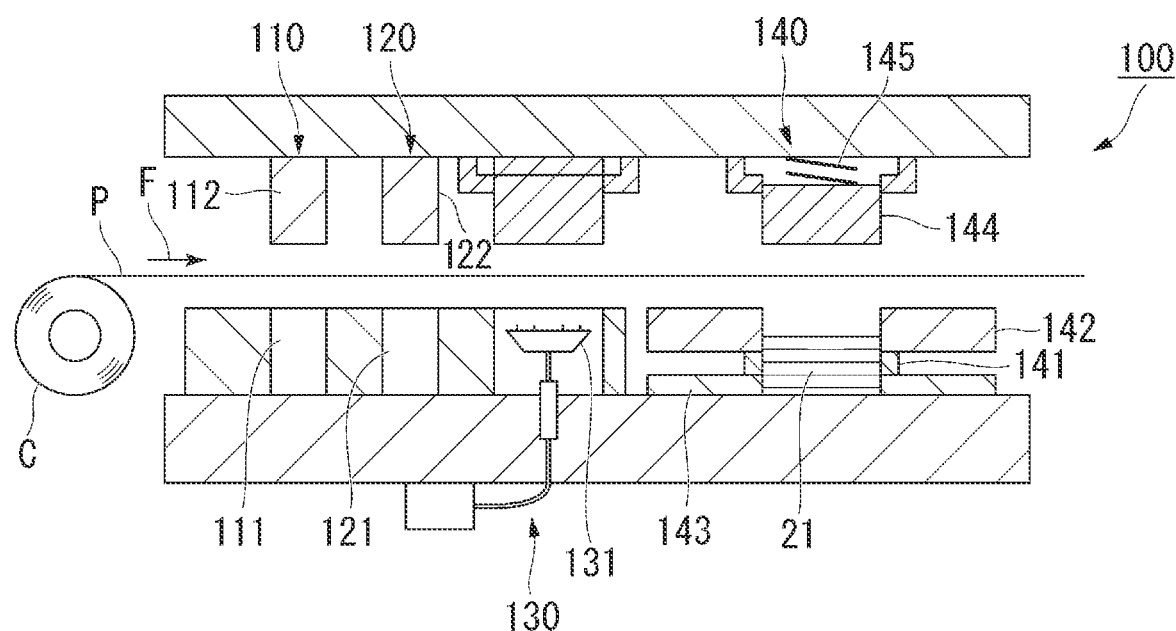
FIG. 4 is a side view of a manufacturing device used for manufacturing an example of the adhesively-laminated core for a stator.

The stator core 21 was manufactured using a manufacturing device 100 illustrated in FIG. 4 while changing various manufacturing conditions.

First, the manufacturing device 100 will be described. In the manufacturing device 100, while an electrical steel sheet P is sent in an arrow F direction from a coil C (hoop), the electrical steel sheet P is punched a plurality of times by a mold disposed at each stage to be gradually formed into a shape of the electrical steel sheet 40, an adhesive is applied to a lower surface of the electrical steel sheet 40, and the punched electrical steel sheet 40 is laminated and pressure-adhered while a temperature is raised to form the adhesion part 41.

As illustrated in FIG. 4, the manufacturing device 100 includes a first stage punching station 110 at a position closest to the coil C, a second stage punching station 120 disposed adjacent to the punching station 110 on a downstream side in a conveying direction of the electrical steel sheet P, and an adhesive-coating station 130 disposed adjacent to the punching station 120 on a further downstream side.

The punching station 110 includes a fixed mold 111 disposed below the electrical steel sheet P and a male mold 112 disposed above the electrical steel sheet P.

The punching station 120 includes a fixed mold 121 disposed below the electrical steel sheet P and a male mold 122 disposed above the electrical steel sheet P.

The adhesive-coating station 130 includes an applicator 131 having a plurality of injectors disposed according to an application pattern of the adhesive.

The manufacturing device 100 further includes the stacking station 140 at a position downstream of the adhesive-coating station 130. The stacking station 140 includes a heating device 141, a fixed mold for outer shape 142, a heat insulating member 143, a fixed mold for inner shape 144, and a spring 145.

The heating device 141, the fixed mold for outer shape 142, and the heat insulating member 143 are disposed below the electrical steel sheet P. On the other hand, the fixed mold for inner shape 144 and the spring 145 are disposed above the electrical steel sheet P. Reference symbol 21 indicates the stator core.

In the manufacturing device 100 having the above-described configuration, first, the electrical steel sheet P is sequentially sent from the coil C in the arrow F direction of FIG. 4. Then, punching processing by the punching station 110 is first performed with respect to the electrical steel sheet P. Next, punching processing by the punching station 120 is performed with respect to the electrical steel sheet P. Due to punching processing of these, a shape of the electrical steel sheet 40 having the core back part 22 and the plurality of tooth parts 23 illustrated in FIG. 3 is obtained in the electrical steel sheet P. However, since it is not completely punched out at this point, the processing proceeds to the next step in the arrow F direction. At the adhesive-coating station 130 in the next step, the adhesive supplied from the injectors of the applicator 131 is applied in a dot shape.

Finally, the electrical steel sheet P is sent to the stacking station 140, punched out by the fixed mold for inner shape 144, and laminated with high accuracy. At the time of the lamination, the electrical steel sheet 40 receives a constant pressing force due to the spring 145. The punching step, the adhesive application step, and the laminating step as described above are sequentially repeated, and thereby a predetermined number of electrical steel sheets 40 can be laminated. Further, the laminated core formed by laminating the electrical steel sheets 40 in this way is heated to, for example, a temperature of 200° C. by the heating device 141. The adhesive is cured by the heating and the adhesion part 41 is formed.

The stator core 21 is completed by the steps described above.

The stator cores 21 shown in No. 1 to No. 31 of Table 1A and Table 1B were manufactured using the manufacturing device 100 described above. Chemical components of the electrical steel sheet 40 used in manufacturing each of the stator cores 21 were uniformized as follows. In addition, values of the components are all represented in % by mass. Also, the average value YP of the yield strength of each electrical steel sheet 40 is also shown in Table 1A.

Si: 3.1%
Al: 0.7%
Mn: 0.3%
Remainder: Fe and impurities

TABLE 1A

| | Electrical steel sheet | | Adhesion part | | | | | | | |
|---|---|---|---|---|---|---|---|---|---|---|
| No. | Average sheet thickness t1 (mm) | Average value of yield strength YP (MPa) | Insulation coating Average thickness (μm) | Average thickness t2 (μm) | Average tensile modulus of elasticity (MPa) | Disposition pattern | Whether expression 1(*a) is satisfied or not | Whether expression 4(*b) is satisfied or not | Whether condition A is satisfied or not | Whether condition B is satisfied or not |
| 1 | 0.15 | 380 | 0.8 | 2.4 | 4000 | Disposition in dot shape | Not satisfied | Not satisfied | Not satisfied | Not satisfied |
| 2 | 0.15 | 380 | 0.8 | 0.8 | 4000 | Disposition in dot shape | Satisfied | Satisfied | Satisfied | Satisfied |

TABLE 1A-continued

| | Electrical steel sheet | | | Adhesion part | | | | | | |
|---|---|---|---|---|---|---|---|---|---|---|
| No. | Average sheet thickness t1 (mm) | Average value of yield strength YP (MPa) | Insulation coating Average thickness (μm) | Average thickness t2 (μm) | Average tensile modulus of elasticity (MPa) | Disposition pattern | Whether expression 1(*a) is satisfied or not | Whether expression 4(*b) is satisfied or not | Whether condition A is satisfied or not | Whether condition B is satisfied or not |
| 3 | 0.15 | 380 | 0.8 | 1.3 | 4000 | Disposition in dot shape | Satisfied | Satisfied | Satisfied | Satisfied |
| 4 | 0.15 | 380 | 0.8 | 1.1 | 5800 | Disposition in dot shape | Satisfied | Satisfied | Satisfied | Satisfied |
| 5 | 0.20 | 415 | 1.0 | 0.3 | 2000 | Disposition in dot shape | Satisfied | Satisfied | Not satisfied | Not satisfied |
| 6 | 0.20 | 415 | 1.0 | 0.9 | 3800 | Disposition in dot shape | Satisfied | Satisfied | Satisfied | Satisfied |
| 7 | 0.20 | 415 | 1.0 | 1.4 | 3800 | Disposition in dot shape | Satisfied | Satisfied | Satisfied | Satisfied |
| 8 | 0.20 | 415 | 1.0 | 1.7 | 3800 | Disposition in dot shape | Satisfied | Satisfied | Satisfied | Satisfied |
| 9 | 0.20 | 415 | 1.0 | 2.9 | 3800 | Disposition in dot shape | Satisfied | Satisfied | Not satisfied | Not satisfied |
| 10 | 0.20 | 415 | 1.0 | 1.0 | 5800 | Disposition in dot shape | Satisfied | Satisfied | Satisfied | Satisfied |
| 11 | 0.23 | 460 | 0.8 | 0.4 | 4000 | Disposition in dot shape | Satisfied | Satisfied | Not satisfied | Not satisfied |
| 12 | 0.23 | 460 | 0.8 | 1.1 | 4000 | Disposition in dot shape | Satisfied | Satisfied | Satisfied | Satisfied |
| 13 | 0.23 | 460 | 0.8 | 1.9 | 4000 | Disposition in dot shape | Satisfied | Satisfied | Satisfied | Satisfied |
| 14 | 0.23 | 460 | 0.8 | 3.0 | 4000 | Disposition in dot shape | Satisfied | Satisfied | Not satisfied | Not satisfied |
| 15 | 0.23 | 460 | 0.8 | 1.0 | 5800 | Disposition in dot shape | Satisfied | Satisfied | Satisfied | Satisfied |
| 16 | 0.25 | 500 | 0.8 | 0.4 | 3000 | Disposition in dot shape | Not satisfied | Not satisfied | Not satisfied | Not satisfied |
| 17 | 0.25 | 500 | 0.8 | 1.4 | 3000 | Disposition in dot shape | Satisfied | Satisfied | Satisfied | Satisfied |
| 18 | 0.25 | 500 | 0.8 | 2.0 | 3000 | Disposition in dot shape | Satisfied | Satisfied | Satisfied | Satisfied |
| 19 | 0.25 | 500 | 0.8 | 2.4 | 3000 | Disposition in dot shape | Satisfied | Satisfied | Satisfied | Satisfied |
| 20 | 0.25 | 500 | 0.8 | 2.7 | 3000 | Disposition in dot shape | Satisfied | Satisfied | Not satisfied | Not satisfied |
| 21 | 0.25 | 500 | 0.8 | 1.0 | 2100 | Disposition in dot shape | Satisfied | Satisfied | Satisfied | Satisfied |
| 22 | 0.27 | 530 | 0.9 | 0.7 | 4500 | Disposition in dot shape | Not satisfied | Not satisfied | Not satisfied | Not satisfied |
| 23 | 0.27 | 530 | 0.9 | 1.8 | 4500 | Disposition in dot shape | Satisfied | Satisfied | Satisfied | Satisfied |
| 24 | 0.27 | 530 | 0.9 | 2.2 | 4500 | Disposition in dot shape | Satisfied | Satisfied | Satisfied | Satisfied |
| 25 | 0.27 | 530 | 0.9 | 3.4 | 4500 | Disposition in dot shape | Satisfied | Satisfied | Not satisfied | Not satisfied |
| 26 | 0.27 | 530 | 0.9 | 1.4 | 2100 | Disposition in dot shape | Satisfied | Satisfied | Satisfied | Satisfied |
| 27 | 0.30 | 555 | 1.1 | 1.3 | 2700 | Disposition in dot shape | Not satisfied | Not satisfied | Not satisfied | Not satisfied |
| 28 | 0.30 | 555 | 1.1 | 1.4 | 2700 | Disposition in dot shape | Not satisfied | Not satisfied | Not satisfied | Not satisfied |
| 29 | 0.30 | 555 | 1.1 | 3.2 | 2700 | Disposition in dot shape | Satisfied | Satisfied | Not satisfied | Not satisfied |
| 30 | 0.20 | 360 | 1.0 | 1.2 | 3800 | Disposition in dot shape | Satisfied | Satisfied | Satisfied | Not satisfied |
| 31 | 0.30 | 475 | 1.1 | 2.0 | 2700 | Disposition in dot shape | Satisfied | Satisfied | Not satisfied | Satisfied |

TABLE 1B

| | Mechanical strength | | Magnetic properties | | Invention example/ Comparative |
|---|---|---|---|---|---|
| No. | MPa | Judgment | W15/50 | Judgment | example |
| 1 | 8 | Excellent | 2.67 | Bad | Comparative example |
| 2 | 7 | Excellent | 2.33 | Excellent | Invention example |
| 3 | 8 | Excellent | 2.39 | Satisfactory | Invention example |
| 4 | 9 | Excellent | 2.70 | Bad | Comparative example |
| 5 | 1 | Bad | 2.32 | Excellent | Comparative example |
| 6 | 8 | Excellent | 2.33 | Excellent | Invention example |
| 7 | 9 | Excellent | 2.32 | Excellent | Invention example |
| 8 | 8 | Excellent | 2.36 | Excellent | Invention example |
| 9 | 1 | Bad | 2.54 | Bad | Comparative example |
| 10 | 6 | Satisfactory | 2.66 | Bad | Comparative example |
| 11 | 1 | Bad | 2.32 | Excellent | Comparative example |
| 12 | 9 | Excellent | 2.31 | Excellent | Invention example |
| 13 | 9 | Excellent | 2.29 | Excellent | Invention example |
| 14 | 8 | Excellent | 2.57 | Bad | Comparative example |
| 15 | 5 | Satisfactory | 2.55 | Bad | Comparative example |
| 16 | 1 | Bad | 2.38 | Satisfactory | Comparative example |
| 17 | 5 | Satisfactory | 2.37 | Satisfactory | Invention example |
| 18 | 10 | Excellent | 2.38 | Satisfactory | Invention example |
| 19 | 8 | Excellent | 2.39 | Satisfactory | Invention example |
| 20 | 6 | Satisfactory | 2.64 | Bad | Comparative example |
| 21 | 3 | Bad | 2.40 | Satisfactory | Comparative example |
| 22 | 2 | Bad | 2.39 | Satisfactory | Comparative example |
| 23 | 10 | Excellent | 2.40 | Satisfactory | Invention example |
| 24 | 9 | Excellent | 2.41 | Satisfactory | Invention example |
| 25 | 6 | Satisfactory | 2.63 | Bad | Comparative example |
| 26 | 1 | Bad | 2.64 | Bad | Comparative example |
| 27 | 3 | Bad | 2.41 | Satisfactory | Comparative example |
| 28 | 3 | Bad | 2.42 | Satisfactory | Comparative example |
| 29 | 2 | Bad | 2.41 | Satisfactory | Comparative example |
| 30 | 6 | Satisfactory | 2.46 | Satisfactory | Invention example |
| 31 | 5 | Satisfactory | 2.44 | Satisfactory | Invention example |

Specifically, a plurality of hoops (coils C) having the above-described chemical components were prepared. Sheet thicknesses of the base steels of the hoops were six types including 0.15 mm, 0.20 mm, 0.23 mm, 0.25 mm, 0.27 mm, and 0.30 mm. An insulation coating liquid containing a metal phosphate and an acrylic resin emulsion was applied to each of the hoops and baking was performed at 300° C. to form an insulation coating of 0.8 μm on one side.

A single-plate core (the electrical steel sheet 40) which has a ring shape with an outer diameter of 300 mm and an inner diameter of 240 mm and to which 18 rectangular tooth parts tooth parts 23 each having a length of 30 mm and a width of 15 mm are provided on the inner diameter side was formed by punching each of the hoops using the manufacturing device 100 described above.

Next, while sending the punched single-plate cores in sequence, the adhesive was applied in a dot shape to the positions illustrated in FIG. 3, and the single-plate cores were laminated and then cured by being heated while being pressurized at a predetermined pressure to form the adhesion part 41. A laminated core (the stator core 21) was manufactured by repeating the same operation for 130 single-plate cores.

The laminated core manufactured by the method described above was cut in a cross section including its axis. Then, an average thickness was obtained for the insulation coating. Also, for the adhesion part 41, the average thickness t2 (μm) and the average tensile modulus of elasticity after curing were obtained. The average tensile modulus of elasticity was obtained using the method described above. Also, an outer diameter of each adhesion part 41 was 5 mm on average. As a method of obtaining the average value YP of the yield strengths of the single-plate cores, the method according to JIS Z 2241 was used.

Then, the average thickness t1 (mm), the average thickness t2 (μm), and the average value YP (MPa) of the yield strength were substituted into the above-described expressions 1 and 4 to judge whether or not the expressions were satisfied. The results are also shown in Table 1A. Further, the average thickness t1 (mm) and the average thickness t2 (μm) were measured as the description specified above.

Further, a mechanical strength of the laminated core was also evaluated. In the evaluation of the mechanical strength, a cutting edge having a width of 20 mm and a distal end angle of 10° with 0.15 mmR was pressed against the laminated part (between a pair of electrical steel sheets 40 adjacent to each other) of the laminated core while increasing a load, and a magnitude of the load when it was cracked was evaluated. The higher the load, the more preferable it is, and the load of 4 MPa or higher was judged to be satisfactory or excellent. In the mechanical strength of Table 1B, "excellent" indicates that a high mechanical strength is secured, "satisfactory" indicates that a necessary and sufficient mechanical strength is secured, and "bad" indicates not reaching a minimum necessary mechanical strength.

Further, magnetic properties of the laminated core were also evaluated. When the magnetic properties were evaluated, the number of laminated electrical steel sheets 40 was set to 20, winding was performed after the laminated core was covered with insulating paper, and core loss (W15/50 in Table 1B) was measured at a frequency of 50 Hz and a magnetic flux density of 1.5 Tesla. Here, the number of laminated electrical steel sheets 40 for the evaluation of the magnetic properties was set to 20 because almost the same result as in the case of 130 sheets can be obtained.

The lower the core loss (W15/50 in Table 1B), the more preferable it is, and the core loss of 2.50 or less were judged to be satisfactory or excellent. In the magnetic properties of Table 1B, "excellent" indicates that very high magnetic properties can be secured, "satisfactory" indicates that necessary and sufficient magnetic properties are secured, and "bad" indicates that it is lower than minimum necessary magnetic properties.

Figure 5:
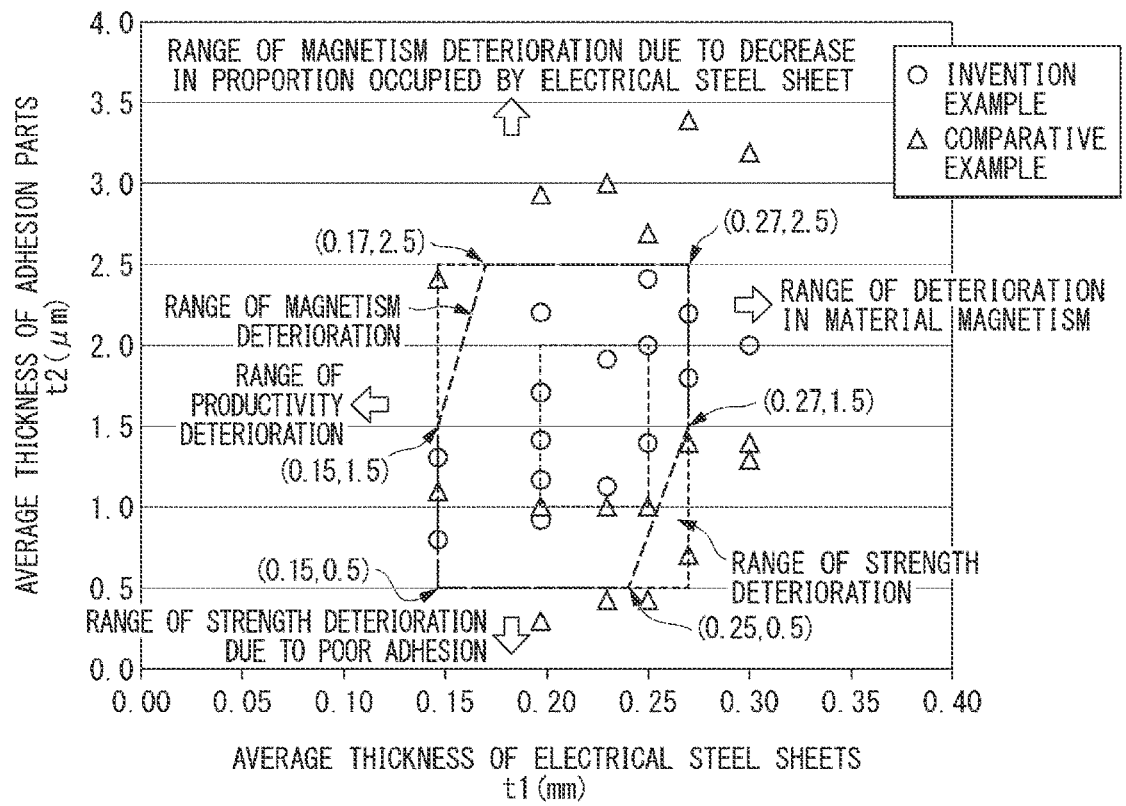
FIG. 5 is a graph showing a relationship between an average sheet thickness t1 of electrical steel sheets and an average thickness t2 of the adhesion parts in the same example.
Figure 6:
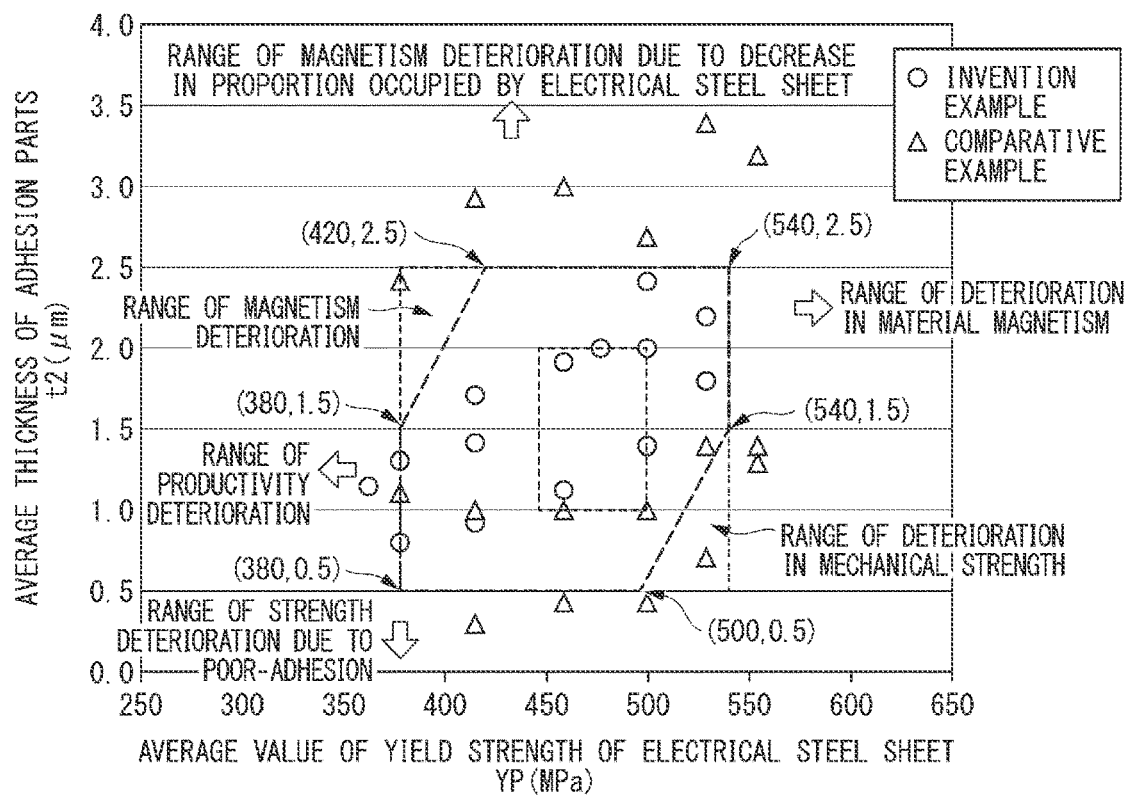
FIG. 6 is a graph showing a relationship between an average value YP of yield strengths of the electrical steel sheets and the average thickness t2 of the adhesion parts in the same example.

Also, FIG. 5 shows a graph summarizing the results shown in Table 1A as a relationship between the average thickness t1 of the electrical steel sheets 40 and the average thickness t2 of the adhesion parts 41. Similarly, FIG. 6 shows a graph summarizing the results shown in Table 1A as a relationship between the average value YP of the yield strengths of the electrical steel sheets 40 and the average thickness t2 of the adhesion parts 41.

As shown in Table 1A and Table 1B, in a comparative example shown in No. 1, since expressions 1 and 4 were not satisfied, the magnetic properties deteriorated.

Also, in a comparative example shown in No. 4, since a unit strength of the adhesion part was too high, the stress applied to the electrical steel sheet was too high, and the magnetic properties deteriorated.

Also, in a comparative example shown in No. 5, the average thickness t2 of the adhesion parts was too small and thus a sufficient adhesion force could not be secured.

Also, in a comparative example shown in No. 9, the average thickness t2 of the adhesion parts was too large with respect to the small average sheet thickness t1 of the electrical steel sheet. As a result, a strain occurred in the electrical steel sheet and the magnetic properties deteriorated.

Also, in a comparative example shown in No. 10, since a unit strength of the adhesion part was too high, the stress applied to the electrical steel sheet was too high and thus the magnetic properties deteriorated.

Also, in a comparative example shown in No. 11, the average thickness t2 of the adhesion parts was too small and a sufficient adhesion force could not be secured.

Also, in a comparative example shown in No. 14, the average thickness t2 of the adhesion parts was too large, a proportion occupied by the electrical steel sheet in the laminated core decreased, and the magnetic properties of the laminated core deteriorated.

Also, in a comparative example shown in No. 15, since a unit strength of the adhesion part was too high, the stress applied to the electrical steel sheet was too high and thus the magnetic properties deteriorated.

Also, in a comparative example shown in No. 16, the average thickness t2 of the adhesion parts was too small and a sufficient adhesion force could not be secured.

Also, in a comparative example shown in No. 20, the average thickness t2 of the adhesion parts was too large, a proportion occupied by the electrical steel sheet in the laminated core decreased, and the magnetic properties of the laminated core deteriorated.

Also, in a comparative example shown in No. 21, the adhesion part was too soft and the mechanical strength deteriorated.

Also, in a comparative example shown in No. 22, since the expressions 1 and 4 were not satisfied, the mechanical strength deteriorated.

Also, in a comparative example shown in No. 25, the average thickness t2 of the adhesion parts was too large, causing a strain in the electrical steel sheet, and this affected the magnetic properties.

Also, in a comparative example shown in No. 26, the adhesion part was too soft, causing a strain in the electrical steel sheet, and both the mechanical strength and magnetic properties deteriorated.

Also, in comparative examples shown in No. 27 to 29, since the average sheet thickness t1 of the electrical steel sheets was too large, a strength of the adhesion part was relatively decreased, and the mechanical strength as the laminated core decreased.

On the other hand, in invention examples including No. 2, 3, 6 to 8, 12, 13, 17 to 19, 23, 24, 30, and 31, it was ascertained that a desired performance was secured in both the mechanical strength and the magnetic properties as the laminated core. Among these invention examples, No. 2, 3, 6 to 8, 12, 13, 17 to 19, 23, and 24 satisfied both the condition A and the condition B and thus could obtain more preferable results than No. 30 and 31 which satisfied only one of the condition A and the condition B.

One embodiment and examples of the present invention have been described above. However, the technical scope of the present invention is not limited only to the above-described embodiment and examples, and various modifications can be made in a range not departing from the meaning of the present invention.

For example, a shape of the stator core 21 is not limited only to the form illustrated in the above-described embodiment. Specifically, dimensions of the outer diameter and inner diameter, a laminated thickness, and the number of slots of the stator core 21, a dimensional ratio of the tooth part 23 in the circumferential direction and the radial direction, a dimensional ratio in the radial direction between the tooth part 23 and the core back part 22, or the like can be arbitrarily designed according to desired characteristics of the electric motor.

In the rotor 30 of the above-described embodiment, a set of two permanent magnets 32 forms one magnetic pole, but the present invention is not limited only to the form. For example, one permanent magnet 32 may form one magnetic pole, or three or more permanent magnets 32 may form one magnetic pole.

In the above-described embodiment, the permanent magnetic field type electric motor has been described as an example of the electric motor 10, but a structure of the electric motor 10 is not limited only thereto as will be illustrated below, and furthermore, various known structures not illustrated below can also be employed.

In the above-described embodiment, the permanent magnetic field type electric motor has been described as an example of the electric motor 10, but the present invention is not limited only thereto. For example, the electric motor 10 may also be a reluctance type electric motor or an electromagnet field type electric motor (winding field type electric motor).

In the above-described embodiment, the synchronous motor has been described as an example of the AC motor, but the present invention is not limited thereto. For example, the electric motor 10 may also be an induction motor.

In the above-described embodiment, the AC motor has been described as an example of the electric motor 10, but the present invention is not limited thereto. For example, the electric motor 10 may be a DC motor.

In the above-described embodiment, the motor has been described as an example of the electric motor 10, but the present invention is not limited thereto. For example, the electric motor 10 may be a generator.

In addition, the components in the above-described embodiments can be appropriately replaced with well-known components within a range not departing from the meaning of the present invention, and the modified examples described above may be appropriately combined.

INDUSTRIAL APPLICABILITY

According to the present invention, it is possible to provide an adhesively-laminated core for a stator in which deterioration in magnetic properties due to cure shrinkage of an adhesive can be suppressed and an electric motor including the adhesively-laminated core for a stator. Therefore, industrial applicability is high.

BRIEF DESCRIPTION OF THE REFERENCE SYMBOLS

10 Electric motor
21 Adhesively-laminated core for stator
40 Electrical steel sheet
41 Adhesion part

The invention claimed is:

1. An adhesively-laminated core for a stator comprising:
a plurality of electrical steel sheets laminated on each other and each coated on both sides with an insulation coating; and
an adhesion part disposed in a plurality of dots between each of electrical steel sheets adjacent to each other in a stacking direction and configured to cause the each of electrical steel sheets to be adhered to each other, wherein
a chemical component of the each of electrical steel sheets includes 2.5% to 3.9% by mass of Si,
an average tensile modulus of elasticity of each of adhesion parts is 2500 MPa to 5000 MPa, and
when an average sheet thickness of the each of electrical steel sheets is t1 in units of mm, an average thickness of the each of adhesion parts is t2 in units of μm, and an average value of yield strengths of the each of electrical steel sheets is YP in units of MPa, the following expressions 1, 2, 3, 4, and 5 are all satisfied:

$$50 \times t1 - 12 \leq t2 \leq 50 \times t1 - 6 \quad \text{(expression 1)}$$

$$0.15 \leq t1 \leq 0.27 \quad \text{(expression 2)}$$

$$0.5 \leq t2 \leq 2.5 \quad \text{(expression 3)}$$

$$0.025 \times YP - 12 \leq t2 \leq 0.025 \times YP - 8 \quad \text{(expression 4)}$$

$$380 \leq YP \leq 540 \quad \text{(expression 5).}$$

2. The adhesively-laminated core for a stator according to claim 1, wherein
the average sheet thickness t1 is in a range of 0.20 mm to 0.25 mm, and
the average thickness t2 is in a range of 1.0 μm to 2.0 μm.

3. The adhesively-laminated core for a stator according to claim 1, wherein
the average thickness t2 is in a range of 1.0 μm to 2.0 μm, and
the average value YP of the yield strengths is in a range of 450 MPa to 500 MPa.

4. The adhesively-laminated core for a stator according to any one of claims 1 to 3, wherein the each of adhesion parts contains an acrylic-based oil surface adhesive or an epoxy-based oil surface adhesive or a combination thereof as an oil component.

5. The adhesively-laminated core for a stator according to any one of claims 1 to 3, wherein the each of adhesion parts is an acrylic-based adhesive of a room temperature curing type containing a second generation acrylic adhesive (SGA) including an elastomer-containing acrylic-based adhesive.

6. An electric motor comprising the adhesively-laminated core for a stator according to claim 1.

* * * * *